April 4, 1950
C. J. E. OMERON
2,502,743
SAFETY CONTROL FOR ENCLOSED
INTERNAL-COMBUSTION ENGINES
Filed Aug. 1, 1947
3 Sheets-Sheet 1
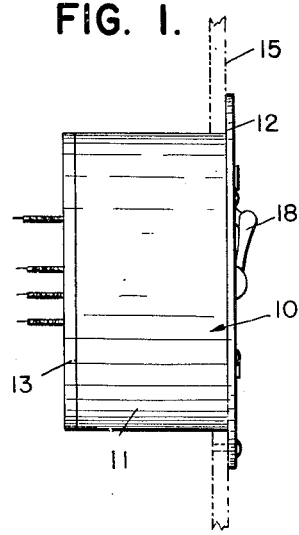
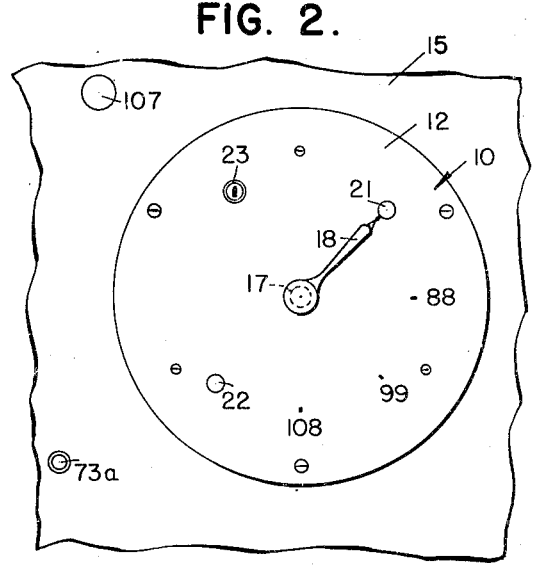
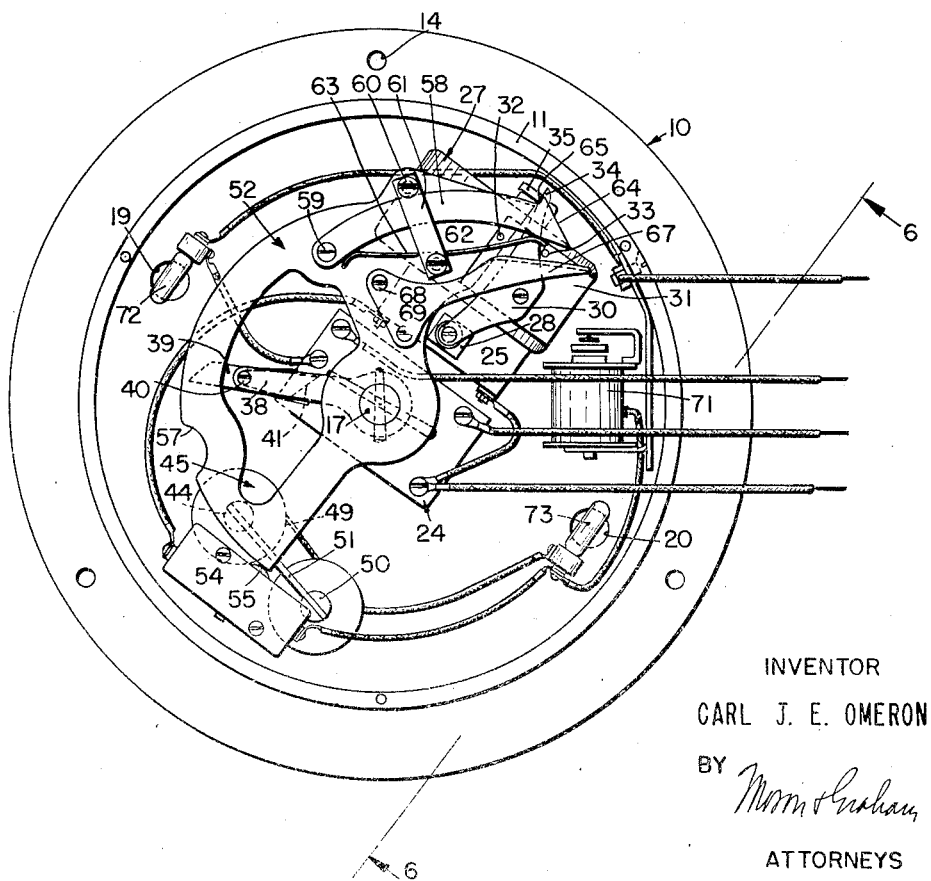
INVENTOR
CARL J. E. OMERON
BY
ATTORNEYS April 4, 1950

C. J. E. OMERON 2,502,743

SAFETY CONTROL FOR ENCLOSED
INTERNAL-COMBUSTION ENGINES

Filed Aug. 1, 1947

INVENTOR
CARL J. E. OMERON
BY
*Norm Graham*
ATTORNEYS

April 4, 1950
C. J. E. OMERON
2,502,743
SAFETY CONTROL FOR ENCLOSED
INTERNAL-COMBUSTION ENGINES
Filed Aug. 1, 1947
3 Sheets-Sheet 3
FIG. 6.
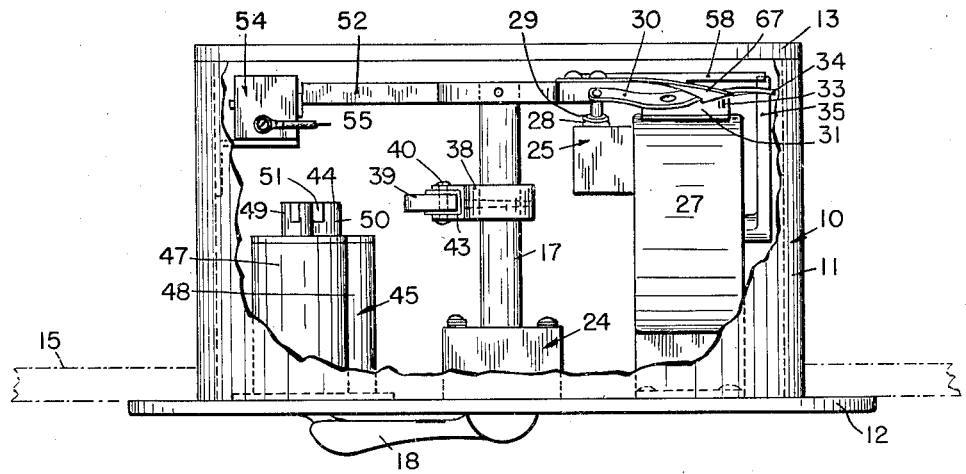
FIG. 7.
FIG. 8.
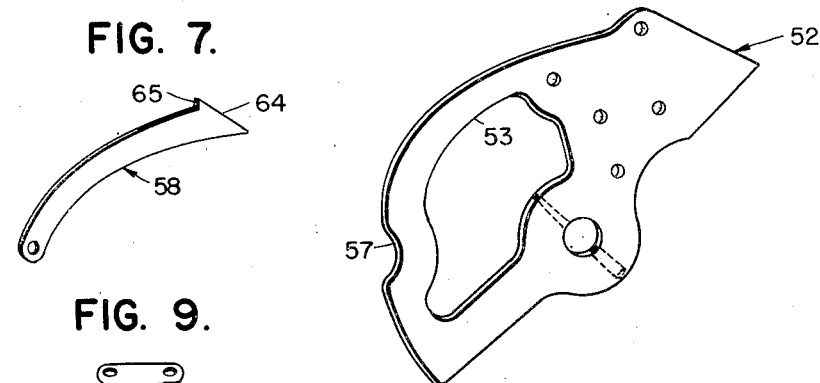
FIG. 9.
FIG. 11.
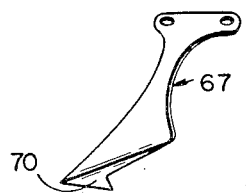
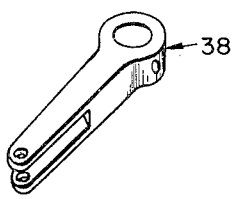
FIG. 10.
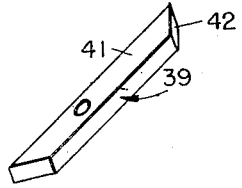
INVENTOR
CARL J. E. OMERON
BY
ATTORNEYS Patented Apr. 4, 1950

2,502,743

UNITED STATES PATENT OFFICE 2,502,743

SAFETY CONTROL FOR ENCLOSED INTERNAL-COMBUSTION ENGINES

Carl J. E. Omeron, Los Angeles, Calif., assignor of one-third to Edwin P. Le May, Miami, and one-third to Chauncey M. Haterius, Miami Beach, Fla.

Application August 1, 1947, Serial No. 765,378

10 Claims. (Cl. 123—179)

1

The present invention relates to electric circuit control devices, and more particularly to an electric circuit control device having time controlled and safety features of operation incorporated therein.

In the operation of gasoline engines enclosed in poorly ventilated compartments, where combustible vapors or the like are apt to be present, as in motor driven boats; such combustible or explosive fumes or the like may be ignited by sparks created, for example, by operation of the electrical starting or ignition systems of the boat engine.

It is required by law that motor boats having enclosed engines be provided with compartment ventilating blowers, and that these blowers be operated for a period of several minutes before starting the boat engine. Operators, however, are apt to become careless, and either shorten the time of blower operation, or at times to eliminate it entirely. Such carelessness or oversight has been the cause of numerous fires and explosions, resulting in loss of the boat, and frequently in death or severe injury to the boat's occupants.

An object of the present invention is to make a time controlled starter and ignition circuit control apparatus, whereby a ventilating blower installed in the engine compartment of a boat having an internal combustion engine therein may be operated at any time; but wherein the electrical starting and ignition circuits of the boat engine are prevented from being energized until after the lapse of a predetermined time interval, during which interval the blower remains actuated.

Another object is to make an improved circuit control apparatus for use on boats having internal combustion propulsion engines.

Another object is to make an improved and simplified blower ignition and starting circuit control device for internal combustion engine driven boats.

Another object is to make a circuit control device with emergency release, for safety control of a compartment ventilating blower circuit, and engine ignition and starter circuits, for enclosed internal combustion engine installations.

These and other objects of the invention will be more fully set forth in the following description and the accompanying drawings, comprising three sheets. In the drawings:

Figs. 1 and 2 are side and front elevational views, respectively, of a time controlled device mounted in a fragment of an instrument panel in accordance with the present invention;

Fig. 3 is a somewhat enlarged rear elevational view of the unit shown in Figs. 1 and 2, with a real closure plate removed, wiring therefor being shown somewhat diagrammatically, the device being shown in "off" position;

2

Figure 4:
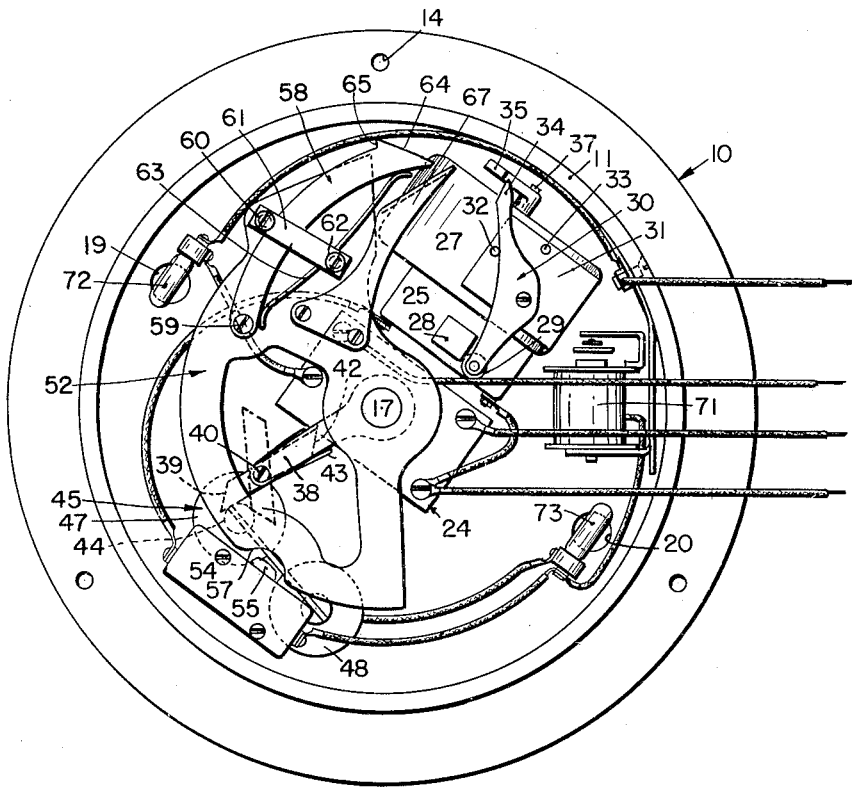
Figure 5:
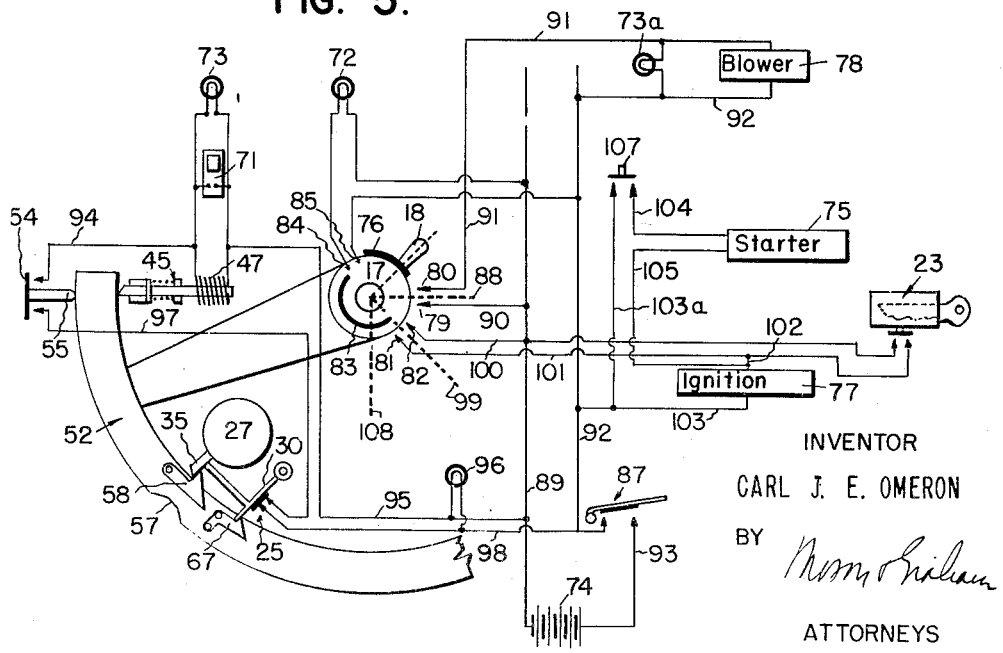

Fig. 4 is a view similar to Fig. 3, the parts being shown in "blower on" position;

Fig. 5 is a diagrammatic circuit drawing of the invention, the device being shown in "off" position;

Fig. 6 is a side elevational view of the device drawn to the same scale as in Figs. 3 and 4, as it would appear looking in the direction of arrows 6—6 in Fig. 3, a portion of a casing being broken away to show the interior mechanism;

Fig. 7 is a view in perspective of a cocking pawl for cocking a clockwork mechanism;

Fig. 8 is a view in perspective of a segmental plate;

Fig. 9 is a view in perspective of a spring arm for moving a switch operating lever;

Fig. 10 is a view in perspective of a pivoted nose extension for a releasable stop arm; and Fig. 11 is a view in perspective of a stop arm.

Referring to the drawings in detail, a casing 10 comprises a cylindrical body portion 11, a front facing plate or dial 12 of larger diameter than the body portion, and a rear closure plate 13 of the same diameter as the body portion. The front dial 12 has a plurality of marginal holes 14 by means of which the casing may be mounted in an opening in an instrument panel 15.

A central actuating shaft 17 is pivoted centrally of the dial plate 12, and a switch operating handle 18 of a usual type is keyed to the shaft 17 forwardly of the dial. The dial 12 has a plurality of dial markings thereon, preferably bearing indicia designating the various functional positions of the switch handle 18, as shown in Fig. 2.

A pair of light transmitting openings 19 and 20 are provided in the dial plate 12, and red and green jewelled buttons 21 and 22 are mounted in these openings respectively, to indicate switch conditions in a manner to be described later herein. An emergency release switch 23, adapted to be operated by a key, is provided for emergency closing of starting and ignition circuits in a manner to be brought out later herein.

Interiorly of the casing 10, as best shown in Figs. 3 and 4, ordinary engine blower and ignition switches are mounted in a housing 24 secured on the inner side of the dial plate and operatively connected to the shaft 17. A normally closed microswitch 25 is mounted on the side of a clockwork mechanism 27, which in turn is secured on the inner side of the dial plate 12. The microswitch 25 has a domed operating button 28 projecting therefrom in position to be engaged by a domed rivet 29 mounted on one end of a switch operating lever 30.

The switch operating lever 30 is pivoted on a pate 31 which is mounted on the clockwork mechanism 27. Two pins 32 and 33 limit the pivotal movement of the lever 30 between the position shown in Fig. 3 and that shown in Fig. 4. When the lever 30 is in the position shown in Fig. 3, the rivet 29 rides onto the cam button 28 of the microswitch 25, holding the switch open, while when the lever is swung to the position shown in Fig. 4 the rivet 29 is moved clear of the switch button 28, permitting the microswitch 25 to close.

The wiring and various circuits will be described later herein, but in order to clarify the function of this arrangement it may be mentioned at this time that the microswitch 25 is instrumental in the control of a warning buzzer, a signal light and a time release for a lockout of the ignition and starter circuits.

The switch operating lever 30 has an end portion 34 thereof projecting into the path of pivotal movement of a clockworks actuated lever arm 35. This lever arm is mounted on a shaft 37 extending from and operatively connected to the clockwork mechanism 27. This clockwork mechanism is of a well-known type, which when moved to the cocked position shown in Fig. 4, will start the clockwork mechanism, and, after a period of, for example, five minutes, will release the shaft 37, swinging the lever arm 35 to the right from the position illustrated in Fig. 4, thereby moving the lever 30 in a clockwise direction. This moves the rivet 29 onto the switch actuating cam button 28 and opens the microswitch 25.

A limit stop arm 38 is secured to the main switch shaft 17, and has a radially extending nose portion 39 pivotally mounted in the bifurcated outer end of the arm 38 by means of a pivot screw 40. The radially outwardly extending nose portion 39 also has an inwardly extending portion 41 with a diagonally cut inner end 42 which fits against a similar diagonally cut seat on the stop arm 38. A spring 43 normally holds the nose portion 39 in radially extended position, as indicated in Figs. 3 and 4. This permits the extension portion 39 to rotate in a counterclockwise direction relatively to the stop arm 38 from the position illustrated in Figs. 3 and 4, but prevents relative rotation of the portion 39 in the opposite direction.

When the switch shaft 17 is moved from the "off" position to the position for closing the blower actuating switch in the housing 24, the nose portion 39 of the stop arm 38 is prevented from further clockwise rotative movement by engagement with the projecting core 44 of a solenoid 45. The solenoid 45, as illustrated, comprises a pair of solenoid coils 47 and 48 with their cores 49 and 50 yoked together by a transverse bar 51. The double solenoid is illustrated since it has been found to provide a powerful solenoid action. However, a single coil solenoid may be employed if desired.

A segmental member 52 is keyed on the inner end of the central shaft 17, and has an interior portion 53 thereof cut away for lightness. A peripheral portion of this segmental member is circular, and is concentric with the shaft 17. A microswitch 54 has a spring pressed operating button 55 in wiping contact with the circular peripheral portion of this segmental member. The button 55 normally is held by the periphery of the segment in depressed condition to open the microswitch 54.

A notch or detent 57 is provided in the periphery of the segmental member 52, and when the switch button 55 is in registry with this notch, as illustrated in Fig. 4, the microswitch 54 will be released for spring return to its closed condition.

A spring pressed pawl 58, for cocking the clockwork mechanism 27, is pivoted at 59 to the segmental member, and is limited in its outward swinging movement by a screw 60 which holds one end of a bridge strap 61 mounted over the pawl. The other end of the bridge strap 61 is secured by a second screw 62.

A flat spring 63 is held in compression between the second screw 62, and the pawl, urging the pawl outwardly or in a counterclockwise direction, as illustrated in Figs. 3 and 4. The free outer end of the pawl has a sloping cam face 64 which tends to swing the pawl inwardly when engaged by the clockwork actuated lever 35 in moving the switch handle to the "off" position illustrated in Fig. 2.

When the switch handle is moved to the "off" position, a cocking notch 65 in the pawl will engage the clockwork actuated lever 35, so that when the switch handle again is swung in a counterclockwise direction, toward the "blower on" position, as illustrated in Fig. 4, the pawl 58 will swing the clockwork lever to its cocked position.

A light spring metal arm 67 is fastened to the segmental member 52 by screws 68 and 69. This spring arm has a downwardly extending outer end portion 70, which is positioned to engage the outer end of the switch actuating lever 30, when moving the switch handle from the "off" toward the "blower on" position. This swings the switch lever 30 in a counterclockwise direction to the position illustrated in Fig. 4.

A buzzer 71 is mounted on the inner side of the cylindrical casing wall 11, and a pair of small electric signal lights 72 and 73 are mounted one beneath each of the jewelled openings 19 and 20.

In the circuit illustrated in Fig. 5, a compartment ventilating blower 78 may be of a usual type, as are also an engine starter 75 and an engine ignition system 77. The boat's battery is indicated at 74. The switch handle 18 is arranged to have four operative positions as marked on the dial in Fig. 1. The handle is indicated in solid lines in Fig. 5 as being in the "off" position, and is adapted to be rotated clockwise from this position through three other positions. These other three positions, in sequence, are: position two, "blower on"; position three, "blower and ignition on"; and position four, "ignition on." In the circuit drawing of Fig. 5, the blower and ignition switch within the housing 24 is indicated as having an outer conductive quadrant member 76 adapted to have wiping contact successively with, first, a pair of blower circuit switch points 79 and 80, and, next, a pair of ignition circuit switch points 81 and 82.

An inner quadrant 83 of conductive material is adapted to have wiping contact with signal switch points 84 and 85 connected to a signal light circuit for indicating when the switch handle 18 is moved from the "off" position. The segmental member 52 is indicated schematically in Fig. 5, as are other parts and mechanisms previously described.

The main line switch 87 is provided, which is to be left open when the engine and blower are idle, and is to be closed when it is desired to connect the boat battery 74 to the blower, starter and ignition circuits. Since the circuits are rather simple ones, the conductors will be designated by suitable numerals during the following description of the operation of the various circuits.

Assuming that the switch handle 18 is in the "off" position, as illustrated in solid lines in Fig. 5, the first step in the procedure of operating the device through successive stages of an operating cycle comprises: first, closing the main line switch 87, and then moving the switch handle 18 clockwise to its second, or "blower on" position indicated by the dotted line 88. Engagement of the nose portion 39 with the normally projecting core 44 of the solenoid arrests further movement of the lever 18 beyond the "blower on" position.

Movement of the switch handle to the "blower on" position brings the outer switch quadrant 76 into contact with the blower circuit switch points 79 and 80, thereby closing a circuit from the battery 74, through a conductor 89 and a conductor 90, to the switch point 79, thence through the outer quadrant 76 to the other blower switch point 80, thence through a conductor 91, the blower system 78, and a conductor 92 back through the closed main line switch 87 and a conductor 93 to the other side of the battery 74.

I consider it desirable to have a red light 72 illuminated at all times when the switch handle 18 is in other than the "off" position, and a green light 73 illuminated when the switch handle is in the "blower on" position after the elapse of the predetermined time interval. Other signal lights also may be employed to indicate the closing of additional circuits. For example, a signal light 73a which may be mounted at a suitable position, for example on the instrument panel as indicated in Fig. 2, may be connected in parallel across the blower circuit so as to be illuminated when the blower circuit is energized.

As the switch handle 18 is moved from the "off" position to the "blower on" position, the segmental member 52 also rotates with the shaft 17 to which it is secured. This moves the clockwork connected lever 35, as previously described, in a clockwise direction from the "off" position illustrated in Fig. 5, cocking the clockwork mechanism 27, while at the same time the spring arm 67 swings the lever 30 to open the circuit to the solenoid coil 47. Also, on completion of the movement of the switch handle 18 to its second position 88, the microswitch button 55 moves into the notch 57 in the periphery of the segmental member 52, thereby closing this microswitch 54.

At the end of the designated time period for which the clockwork mechanism 27 is set, the arm 35 will be returned by the clockworks to the solid line position shown in Fig. 5, thereby swinging the lever 30 to close the switch 25. This completes a circuit from the battery 74 through the conductor 89, and a conductor 95 to one side of the coil 47 of the solenoid 45. From the other side of the coil of the solenoid the circuit continues through a conductor 94, the closed microswitch 54, thence through a conductor 97, through the clockworks closed switch 25, and thence through a conductor 98 and the conductor 92 to the main line switch 87.

From here the circuit is completed to the other side of the battery through the conductor 93.

An audible and visual signal comprising the buzzer 71 and the green light 73 are connected in parallel with the solenoid coil 47 to be energized concurrently therewith. Completion of the predetermined time interval and the closing of the solenoid circuit, the actuation of the buzzer 71 and the green light signal 73 indicate that the solenoid actuated release is energized, and that the handle 18 may be turned past the second, or "blower on" position 88.

A main line indicating light 96 may be connected across the conductors 95 and 98 to be illuminated on closing the main line switch 87.

When the switch handle 18 is turned to the third or "blower and ignition on" position indicated by a dotted line 99, the other contact quadrant 76 remains in contact with the blower switch contact points 79 and 80, and also closes a circuit across the ignition switch points 81 and 82. It is desired to keep the blower operating until the engine has been started and run for a short time, and for this reason the blower is left on during the starting and run up period of the engine. On moving the switch handle 18, therefore, to this third position, in addition to the previously described blower circuit, which remains closed, a circuit is closed from the battery through the conductor 89 and a conductor 100 to the ignition switch point 82, thence through the outer quadrant 76 to the other ignition switch point 81 and conductors 101 and 102 to one side of the ignition system. From the other side of the ignition system 77 a conductor 103 is connected to the other side of the battery through the conductors 92 and 93 and the main line switch 87.

The key operated emergency release switch 23 is connected across the conductors 100 and 101 for emergency closing of the ignition circuit described above. The starter system 75 is connected through conductors 103a, 104, 105 and a starter switch 107, in parallel with the ignition system 77. Therefore, as soon as the ignition system is energized, the starter circuit also may be completed by closing the starter switch 107. It is essential that the starter circuit be maintained inoperative until it is safe to start the engine, since the starter switch itself frequently produces sparks which might cause a fire or an explosion if the engine compartment were not properly cleared of gases.

Operation of the engine keeps the engine compartment clear of a dangerous collection of fumes and gases, so that ordinarily it is unnecessary to maintain the blower in operation after the engine is well started. Therefore, after the engine is running satisfactorily, the switch handle 18 may be turned to the fourth, or "ignition on" position indicated by a dotted line 108. In this position the outer switch quadrant 76 will be moved out of contact with the blower circuit switch points 79 and 80, but will remain in contact with the ignition circuit switch points 81 and 82.

It is apparent that the switch handle may be moved back and forth between any of its second, third or fourth positions without again causing the cocking pawl 58 or the switch opening spring arm 67 to pass over and engage their respective operated members. Therefore, it is possible for the operator of a boat or other engine installation with which the present system is installed, to shut off the engine by moving the switch handle 18 into the number two position 88, so as to leave the blower running. The buzzer and green light 73 of course will be energized at all times when the switch handle is in the number two or "blower on" position, and the time controlled switch 25 is closed.

Then, at any time, the switch handle may again be swung to the number three or four positions without waiting for the predetermined time interval to elapse. However, when the switch handle is swung back to the "off" position, the clockwork connected arm 35 will again be engaged by the cocking pawl 58, and the switch operating lever 30 also again will be engaged by its spring arm 67. Thus, after the switch lever has been moved to the "off" position, it always is necessary to wait for the predetermined period to elapse between the starting of the blower, and the energizing of the starting and ignition systems, except in emergencies warranting the use of the key controlled emergency release switch 23.

While I have illustrated and described a preferred form of my invention, it will be understood by those familiar with the art that the device is capable of several modifications without departing from the spirit of the invention. It is desired, therefore, not to limit my invention except as defined in the following claims.

I claim:

1. Mechanism for controlling the operation of an internal combustion engine mounted in an enclosed compartment requiring ventilation, said engine having a starter and a compartment ventilating device, both electrically energized; said mechanism comprising a starter control switch and a ventilating control switch, a switch operating member mounted to move in a predetermined cycle from a first position where both of said switches are off into a second position closing said ventilating control switch, and thence continuing the cycle into a third position closing the starter control switch, stop means mounted to arrest the movement of the switch operating member in said cycle at the second position, a clockworks having a cocking lever mounted in the path of movement of the switch operating member to be operatively engaged thereby in its movement from said first to said second position, electrically energized release means operatively connected to said stop means, and a switch actuated by said clockworks a predetermined time after the cocking of said clockworks lever to energize said release means and release said stop means.

2. Mechanism for controlling the operation of an internal combustion engine mounted in an enclosed compartment requiring ventilation, said engine having a starter and a compartment ventilating device, both electrically energized; said mechanism comprising a starter control switch and a ventilating control switch, a switch operating member mounted to move in a predetermined cycle from a first position where both of said switches are off into a second position closing said ventilating control switch, and thence continuing the cycle into a third position closing the starter control switch, stop means mounted to arrest the movement of the switch operating member in said cycle at the second position, a clockworks having a cocking lever mounted in the path of movement of the switch operating member to be operatively engaged thereby in its movement from said first to said second position, and release means operatively connected to said stop means and to said clockworks to operate said release means and release said stop means on completion of a predetermined timed operation by said clockworks.

3. Mechanism for controlling the operation of an internal combustion engine mounted in an enclosed compartment requiring ventilation, said engine having a starter and a compartment ventilating device, both electrically energized; said mechanism comprising a starter control switch and a ventilating control switch, a switch operating member mounted to move in a predetermined cycle from a first position where both of said switches are off into a second position closing said ventilating control switch, and thence continuing the cycle into a third position closing the starter control switch, a solenoid mounted with a retractable core element normally in the path of movement of said switch operating member, to arrest the movement of the switch operating member in said cycle at the second position, a clockworks having a cocking lever mounted in the path of movement of the switch operating member to be operatively engaged thereby in its movement from said first to said second position, electrically energized release means operatively connected to said stop means, and a switch actuated by said clockworks a predetermined time after the cocking of said clockworks lever to energize said release means and release said stop means.

4. Mechanism for controlling the operation of an internal combustion engine mounted in an enclosed compartment requiring ventilation, said engine having a starter and a compartment ventilating device, both electrically energized; said mechanism comprising a starter control switch and a ventilating control switch, a switch operating member mounted to move in a predetermined cycle from a first position where both of said switches are off into a second position closing said ventilating control switch, and thence continuing the cycle into a third position closing the starter control switch, an arm rigidly connected to said switch operating member and movable therewith, a spring positioned nose portion pivoted on the outer end of said arm, a solenoid coil fixedly mounted adjacent said arm, a retractable core member, spring pressed normally to project from said coil into the path of said extensible nose portion, to engage said nose portion and arrest further cyclic movement of the arm and the switch operating member at the second position thereof, timing means having a cocking element mounted in the path of movement of a switch operating element to be operatively engaged thereby in its movement from said first to said second position, and a switch actuated by said timing means a predetermined time after the cocking of said timing means to energize said solenoid coil, thereby withdrawing the core from the path of said nose portion to free the arm and the switch operating member for movement toward the third position.

5. Electrical circuit control mechanism for an internal combustion engine mounted in an enclosed compartment and having electrical starter, ignition and compartment venting blower equipment, said control mechanism comprising a casing, a switch mounted therein and having a rotative operating cycle with an off position at one end of said cycle, and thence successively from the off position through a blower operating position to an engine operating position, releasable stop means mounted normally to arrest movement of the switch from the off position at the blower operating position, a timed cycle device positioned in the path of switch movement to be energized by switch movement from off to blower operating position, and means operatively interconnecting the stop means and the timed cycle device to release said stop means upon the completion of a predetermined timed cycle for movement of the switch past the blower operating position toward the engine operating position.

6. Electrical circuit control mechanism for an internal combustion engine mounted in an enclosed compartment and having electrical starter, ignition and compartment venting equipment, said control mechanism comprising a casing, a switch mounted therein and having a rotative operating cycle with an off position at one end of said cycle, and thence successively from the off position through a blower operating position to an engine operating position, one way releasable stop means mounted normally to arrest movement of the switch from the off position at the blower operating position, said stop means having spring pressed pawl means mounted thereon, freeing the switch for movement in a reverse direction past the blower operating position, a timed cycle device positioned in the path of switch movement to be energized by switch movement from off to blower operating position, and means operatively interconnecting the stop means and the timed cycle device to release said stop means upon the completion of a predetermined timed cycle for movement of the switch past the blower operating position toward the engine operating position.

7. A device for controlling electrical circuits of an internal combustion engine mounted in an enclosed compartment and having an independently operable compartment venting blower, said device comprising a casing, an engine and blower operating circuit control switch mounted therein, and having an initial off, a secondary venting, and a tertiary engine operating position, an operating handle on said engine circuit control switch, stop means operatively associated with said switch to stop it short of an engine operating condition in blower operating condition, and timed delay release means associated with said stop means to release said switch for movement to an engine operating condition upon the expiration of a predetermined time interval.

8. A device for controlling electrical circuits of an internal combustion engine mounted in an enclosed compartment and having an independently operable compartment venting blower, said device comprising a casing, an engine and blower operating circuit control switch mounted therein, and having an initial off, a secondary venting and a tertiary engine operating position, an operating handle on said engine circuit control switch, stop means operatively associated with said switch to stop it short of an engine operating condition in blower operating condition, and timed delay release means associated with said stop means to release said switch for movement to an engine operating condition upon the expiration of a predetermined time interval, an element of said stop means being free for movement in one direction only to free said switch for return from engine operating condition to off condition.

9. A device for controlling electrical starting and ignition circuits of an internal combustion engine mounted in an enclosed compartment, and having an independently operable compartment venting blower, said device comprising a casing, an engine and blower operating selective circuit control switch mounted therein, said switch having an off position, a venting position and an engine operating position, an operating handle on said engine circuit control switch to move the switch through the above three positions in the sequence set forth and free for reverse movement to the off position from either of the other two positions, a segmental member mounted on the operating handle and movable therewith, a time delay switch, a clockwork mechanism operatively associated with said time delay switch, means supported by said segment and adapted to engage a clockwork element and said time delay switch with the segment in the position occupied with the operating handle in the off position, to move a clockwork element and the time delay switch to cocked, open condition by movement of the operating handle to the venting position, a stop member mounted on an operating handle element to move therewith, electrically actuated means mounted in the path of said stop lever to arrest movement of the stop lever and its associated parts on movement of the operating handle from off to venting position, and an electrical circuit operatively connecting the segment contacting switch, the time controlled switch and the electrically energized stop element to energize said electrically energized stop element on closure of the time control switch by the clockwork element, a predetermined time interval after the cocking of said clockwork element.

10. A device for controlling electrical starting and ignition circuits of an internal combustion engine mounted in an enclosed compartment, and having an independently operable compartment venting blower, said device comprising a casing, an engine and blower operating selective circuit control switch mounted therein, said switch having an off position, a venting position and an engine operating position, an operating handle on said engine circuit control switch to move the switch through the above three positions in the sequence set forth and free for reverse movement to the off position from either of the other two positions, a segmental member mounted on the operating handle and movable therewith, a portion of the periphery of said segmental member being arcuate and having a notch therein, a normally closed spring pressed switch having an operative portion thereof in wiping engagement with the arcuate periphery of said segmental member to be held in open condition thereby, said operating switch element being adapted to move into said notch to close said switch on a setting of said segment determined by positioning the operating handle in the venting position, a time delay switch, a clockwork mechanism operatively associated with said time delay switch, means supported by said segment and adapted to engage a clockwork element and said time delay switch with the segment in the position occupied with the operating handle in the off position, to move a clockwork element and the time delay switch to cocked open condition by movement of the operating handle to the venting position, a stop member mounted on an operating handle element to move therewith, electrically actuated means mounted in the path of said stop lever to arrest movement of the stop lever and its associated parts on movement of the operating handle from off to venting position, and an electrical circuit operatively connecting the segment contacting switch, the time controlled switch and the electrically energized stop element to energize said electrically energized stop element on closure of the time control switch by the clockwork element, a predetermined time interval after the cocking of said clockwork element.

CARL J. E. OMERON.

REFERENCES CITED

The following references are of record in the file of this patent:

Page 113 of July 1945 issue of "Yachting," advertisement of Sutton Mfg. Co.